United States Patent [19]

McLellan et al.

[11] Patent Number: 4,976,389
[45] Date of Patent: Dec. 11, 1990

[54] BICYCLE COVER

[75] Inventors: Michael F. McLellan, Monmouth, Me.; Reza S. Abhari, Somerville, Mass.

[73] Assignee: Cyclone Products Corporation, Cambridge, Mass.

[21] Appl. No.: 334,324

[22] Filed: Apr. 7, 1989

[51] Int. Cl.⁵ .............................................. B06R 9/10
[52] U.S. Cl. .................................... 224/328; 224/316; 224/42.42; 224/318; 296/136; 150/167
[58] Field of Search ............... 224/273, 309, 316, 318, 224/319, 328, 42.07 B, 42.42, 327, 329–331; 296/37.7, 136; 150/167, 166

[56] References Cited

U.S. PATENT DOCUMENTS

| | | | |
|---|---|---|---|
| 3,968,913 | 7/1976 | Weed et al. | 224/42.03 B |
| 4,009,744 | 3/1977 | Joslyn | 150/167 |
| 4,598,725 | 7/1986 | Brewer | 135/95 |
| 4,715,646 | 12/1987 | Goffi et al. | 296/136 |

FOREIGN PATENT DOCUMENTS

| | | | |
|---|---|---|---|
| 2434076 | 4/1980 | France | 296/136 |
| 2551705 | 3/1985 | France | 224/319 |

*Primary Examiner*—Ernest G. Cusick
*Attorney, Agent, or Firm*—Lowe, Price, LeBlanc, Becker & Shur

[57] ABSTRACT

A cover is provided to protect a bicycle from exposure to environmental conditions during transport on a rooftop rack of automobile. Fasteners are used to secure the cover about bicycle. An aperture is located at the rear of the cover, i.e., the aperture opens in a direction opposite the forward motion of automobile as represented by arrow. As a result of a difference in air pressures between the interior and exterior of the cover, a pressure drop occurs at aperture which in turn creates a suctioning effect to inhibit undesirable buffeting and possible tearing of the cover.

9 Claims, 3 Drawing Sheets

BICYCLE COVER

BACKGROUND OF THE INVENTION

1. Field of Invention

This invention relates generally to bicycle covers. More particularly, the present invention relates to a bicycle cover for use with roof-top bicycle racks of automobiles.

2. Discussion of the Related Art

Bicycle enthusiasts often transport their bicycles to enjoyable locations by using a rack secured to the roof of their automobile. The bicycle is thus exposed to a myriad of conditions such as rain, snow, dirt, etc., that can cause damage to the bicycle in the form of corrosion, water damage to leather seats and the contamination of chains, sprockets, etc. by road grit. Such damage is especially troublesome when the bicycle is being transported to a location for a racing competition and limited time and facilities are available for cleaning and repair.

Accordingly, covers have been employed to protect the bicycle from those environmental conditions. For example, U.S. Pat. No. 4,715,646 issued to Goffi et al. discloses a covering which includes semi-circular sheath wheel covers and an overall cover that covers the frame and the semi-circular sheath wheel covers. U.S. Pat. No. 3,968,913 issued to Weed et al. discloses a protective cover which completely surrounds the bicycle for use on a rack fixed to the rear of an automobile. A further reference of interest is U.S. Pat. No. 4,598,725 issued to Brewer which discloses a poncho that can be converted to cover a bicycle.

The above-described covers, however, have a significant drawback particularly when used with a bicycle rack mounted on the roof of a vehicle. As the covered bicycle moves through the air on the top of the automobile, the cover has a tendency to flutter as a result of differences between the air pressure inside the cover and the relatively higher pressures outside the cover. This fluttering can cause the cover to tear, thereby exposing the bicycle to the very environmental conditions the cover was intended to shield. In addition, this fluttering increases the noise which must be endured by the passengers of the automobile.

It would be desirable, therefore, to provide a cover that would sufficiently adhere to the shape of the bicycle to prevent the above-described flutter.

SUMMARY OF THE INVENTION

In view of the above, it is an object of the present inventor to provide a cover which reduces or eliminates any fluttering resulting from movement of the covered bicycle through air.

It is a further object of the invention to provide such a cover which is easily installed on the bicycle.

The foregoing and additional objects are achieved by a cover for a bicycle including a first flexible member having a rear portion; a second flexible member having a rear portion; and means for fastening the first flexible member to the second flexible member whereby said flexible members sealingly cover the bicycle except for an aperture located between the rear portions of the first and second flexible members.

Other objects and advantages of the present invention will become apparent in the specification and drawings which follow.

DETAILED DESCRIPTION OF THE PREFERRED EMBODIMENTS

Figure 1:
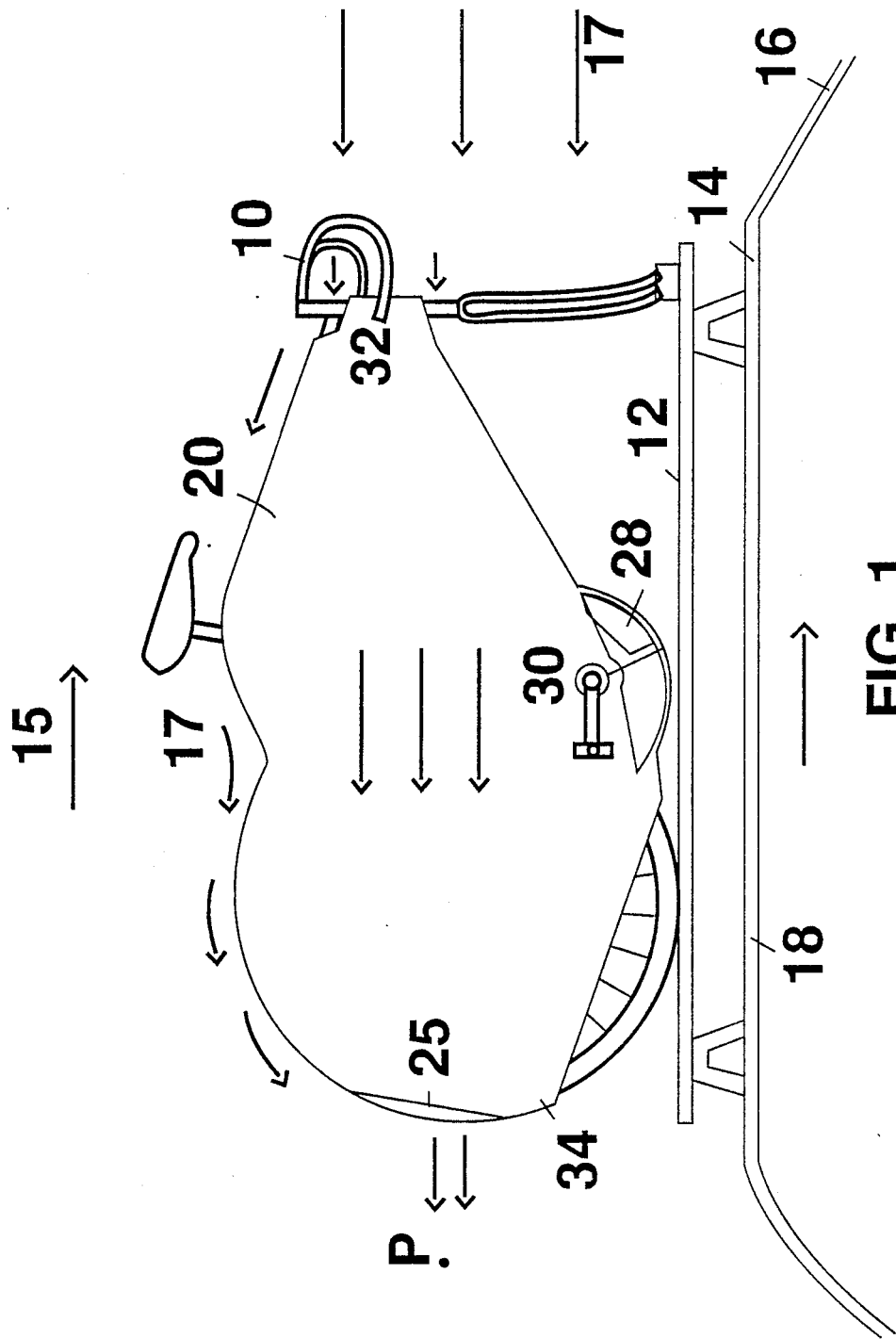
FIG. 1 is a side pictorial of the cover according to the present invention.

In the following description and in the accompanying drawings, like elements or features bear like reference numerals.

Referring to FIG. 1, a bicycle 10 is mounted on a conventional roof-top rack 12 in a conventional manner. Roof-top rack 12 is mounted on the roof 14 of a motor vehicle 16. When motor vehicle 16 travels in the direction indicated by arrow 15, air flow 17 flows in the opposite direction relative to bicycle 10. A cover 20 is provided to protect bicycle 10 from exposure to damaging environmental conditions.

Figure 2:
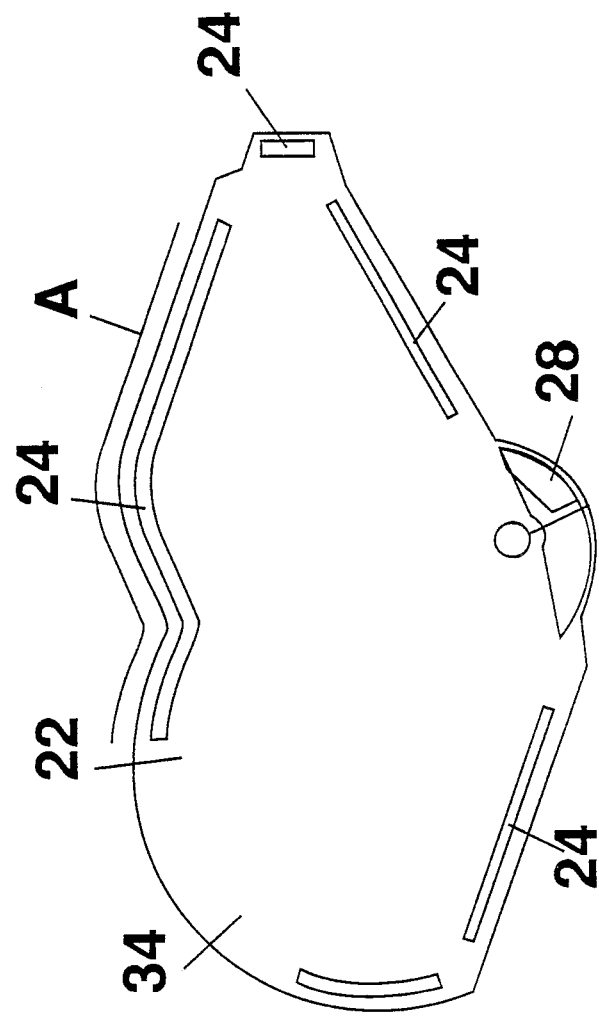
FIG. 2 is a side pictorial of the interior of one half of the cover according to the present invention.

Referring now to FIG. 2, cover 20 is comprised of two halves 22, of which one half 22 is shown. Halves 22 of cover 10 may be composed of any flexible material suitable to protect the bicycle 10 from exposure to damaging environmental conditions. Examples of such materials include various woven nylon fabrics. Fasteners 24 are provided for sealing the edges of the halves 22 together to provide a protective layer about bicycle 10 which is substantially sealed except for an aperture 25 located at a rear edge 34 of the cover 20. Fasteners 24 may be any conventional fastener such as hook and loop fasteners (popularized under the trademark "VELCRO"), zippers, etc.

A protective member 28 may be attached to the inner side of the half 22 which covers the side of bicycle 10 on which a sprocket 30 is located. When the halves 22 are fastened to form cover 20, protective member 28 is so located as to cover sprocket 30. Thus, protective member 28 prevents forceful impacts from damaging sensitive sprocket 30.

In a further embodiment, cover 20 is not composed of two separate halves 22, but instead is a flexible material which is folded over bicycle 10 and is fastened by fasteners 24 to sealingly protect bicycle 10. In such an embodiment, the halves 22 would be sewn or otherwise permanently attached along a top edge A (See FIG. 2) of the cover to allow easy placement of cover 20 on bicycle 10 after bicycle 10 has been mounted on rack 12. An aperture 25 would be provided at the same location as previously discussed.

Figure 3:
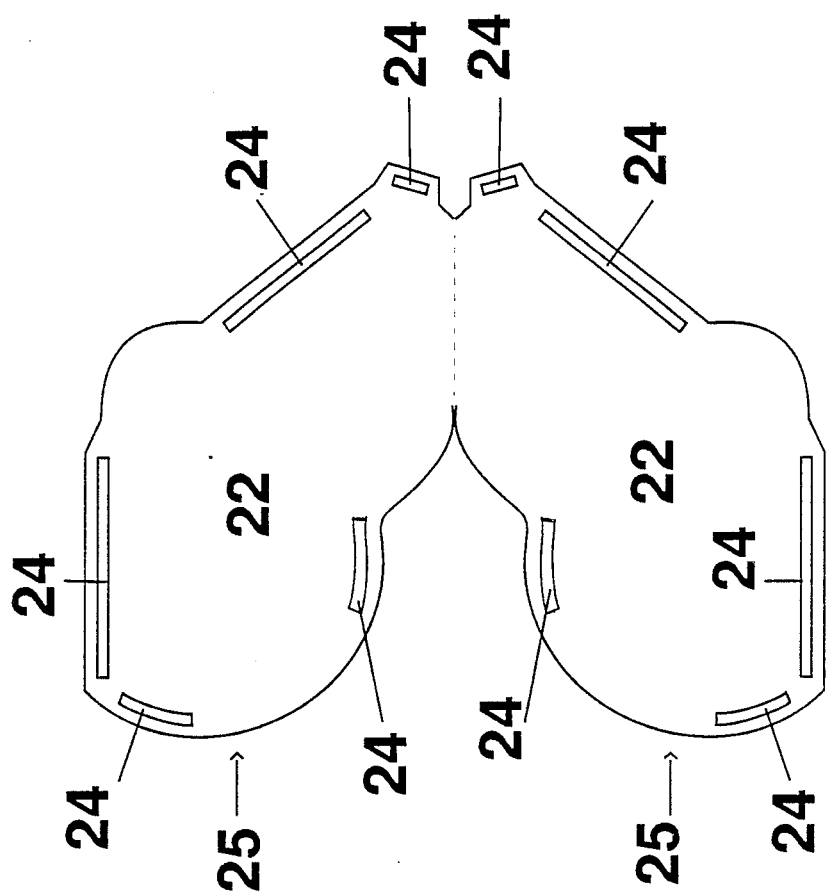
FIG. 3 illustrates a cover in accordance with a second embodiment of the invention.

FIG. 3 illustrates an example of the second embodiment wherein the cover is formed from a single piece of material or two pieces of material permanently attached along line B.

The aerodynamic principles which are utilized to have the cover 20 tightly conform to the bicycle 10 will now be discussed. When motor vehicle 16 travels as indicated by arrow 15, air flow 17 flows in the opposite direction relative to bicycle 10 covered by cover 20. As this airflow 17 contacts cover 20 at front area 32, a wake is formed within airflow 17. Airflow 17 continues to flow alongside cover 20, i.e. airflow 17 is composed of streamlines. These streamlines converge at a point P behind rear area 34 of cover 20 (See FIG. 1). The area between point P and bicycle 10 will be referred to as the base pressure area, the air pressure of the base pressure area being slightly lower than the air pressure outside of the wake.

The present invention utilizes the difference in air pressure between base pressure area and the area outside of the wake to control buffeting of cover 10. Since cover 20 sealingly covers bicycle 10 at front area 32, at most only negligible leakage of airflow 17 into the interior of cover 20 occurs. Thus, the air pressure within cover 20 is less than that of streaming airflow 17 alongside the exterior of cover 20. By locating aperture 25 at the rear area 34 of cover 20, a pressure drop occurs between the interior and exterior air pressures at the base pressure area. This pressure drop results in a normal force in a direction opposite directional arrow 15. Cover 20 therefore stretches in that direction until the normal component of the specific tensile strength of the material used in cover 10 is equal to the normal force caused by the pressure drop, thereby creating a suctioning or ironing-out effect on cover 20. This suctioning effect significantly inhibits the buffeting of cover 20, as verified by visual observation of the present invention under operational conditions.

Since bicycle 10 is oriented with its relatively narrow width opposing airflow 17, only small deflections of airflow 17 occur. Accordingly, only a small pressure drop at the pressure base area is rejoined to produce tensile forces of sufficient magnitude to inhibit buffeting.

The present invention stably inhibits buffeting over a wide range of vehicle speeds. In conventional covers, fluttering increases with vehicle speed. In the present invention, as the speed of airflow 17 increases with vehicle speed, the base pressure is reduced accordingly. Thus, the pressure drop increases and the tensile force likewise increases, resulting in the above-described suctioning effect which inhibits fluttering of cover 20.

Although the invention has been described with reference to preferred embodiments, it will be understood that modifications and changes can be made without departing from the scope and spirit of the invention.

What is claimed is:

1. A cover for a bicycle which is to travel in an airstream in a specified direction comprising:
   a first flexible member having a rear portion in relation to the direction of travel of the bicycle in the airstream; a second flexible member having a rear portion in relation to the direction of travel of the bicycle in the airstream; and fastening means for fastening said first flexible member to said second flexible member;
   wherein said first and second flexible members are adapted to substantially cover the bicycle and define an aperture located between the rear portions of said first and second flexible members when fastened by said fastening means.

2. The cover of claim 1, wherein said fastening means for fastening includes hook and loop fasteners.

3. The cover of claim 1, wherein said first and second flexible members are a woven nylon fabric.

4. A cover for a bicycle which is to travel in an airstream in a specified direction comprising:
   a first flexible member having a rear portion in relation to the direction of travel of the bicycle in the airstream; a second flexible member having a rear portion in relation to the direction of travel of the bicycle in the airstream; a protective member located on the first flexible member adapted to cover a sprocket of the bicycle; and fastening means for fastening said first flexible member to said second flexible member;
   wherein said first and second flexible members are adapted to substantially cover the bicycle and define an aperture located between the rear portions of said first and second flexible members when fastened by said fastening means.

5. A cover for an object which travels in a specified direction a fluid stream, the cover comprising;
   a flexible member having edges, said flexible member surrounds the object;
   sealing means for substantially sealing the edges of the flexible member whereby the flexible member is fitted around the object, said sealing means defining an aperture at one edge of the flexible member, said one edge being located at a rear portion of the cover in relation to the specified direction of travel of the object in the fluid stream.

6. The cover of claim 5, wherein said flexible member comprises two separate portions which are joined together by said sealing means.

7. The cover of claim 5, wherein said sealing means include hook and loop fasteners.

8. The cover of claim 7, wherein said sealing means further includes means for permanently sealing at least one edge of said cover.

9. The cover of claim 5, wherein said flexible member is a woven nylon fabric.

* * * * *